(12) United States Patent
Balasubramanian

(10) Patent No.: US 8,756,576 B2
(45) Date of Patent: Jun. 17, 2014

(54) RANKING PEER SUBMITTED CODE SNIPPETS USING EXECUTION FEEDBACK

(75) Inventor: Swaminathan Balasubramanian, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 12/195,373

(22) Filed: Aug. 20, 2008

(65) Prior Publication Data

US 2010/0050160 A1 Feb. 25, 2010

(51) Int. Cl.
*G06F 9/44* (2006.01)

(52) U.S. Cl.
USPC .......... 717/125; 717/124; 717/126; 717/110; 717/111; 717/112; 717/113; 717/101; 717/103

(58) Field of Classification Search
None
See application file for complete search history.

(56) References Cited

U.S. PATENT DOCUMENTS

| | | | |
|---|---|---|---|
| 6,381,506 B1 | 4/2002 | Grappone | |
| 7,607,066 B2 * | 10/2009 | Gertz et al. | 714/758 |
| 8,312,427 B2 * | 11/2012 | Hutchison et al. | 717/110 |
| 2004/0003335 A1 | 1/2004 | Gertz et al. | |
| 2004/0078785 A1 | 4/2004 | Dutt et al. | |
| 2004/0123186 A1 | 6/2004 | Kulp et al. | |
| 2005/0097508 A1 | 5/2005 | Jacovi et al. | |
| 2006/0085245 A1 | 4/2006 | Takatsuka et al. | |
| 2006/0136876 A1 * | 6/2006 | Melamed et al. | 717/124 |
| 2006/0161819 A1 * | 7/2006 | Nissan-Messing et al. | 714/48 |
| 2007/0055656 A1 | 3/2007 | Tunstall-Pedoe | |
| 2007/0168935 A1 | 7/2007 | Ogami et al. | |
| 2007/0168946 A1 * | 7/2007 | Drissi et al. | 717/110 |
| 2008/0270989 A1 | 10/2008 | Ahadian et al. | |
| 2009/0328004 A1 | 12/2009 | Balasubramanian | |

OTHER PUBLICATIONS

McCarey et al., "Rascal: A Recommender Agent for Agile Reuse," 2005, Artificial Intelligence Review.*
U.S. Appl. No. 12/195,362—Non-Final Office Action Mailed Nov. 28, 2011.
U.S. Appl. No. 12/195,368—Non-Final Office Action Mailed Dec. 7, 2011.
Balasubramanian, S., U.S. Appl. No. 12/195,362, System, Method and Program Product for Guiding Correction of Semantic Errors in Code Using Collaboration Records, filed Aug. 20, 2008.
Balasubramanian, S., U.S. Appl. No. 12/195,368, System, Method and Program Product for Correcting Semantic Errors in Code Using Peer Submitted Code Snippets, filed Aug. 20, 2008.

(Continued)

*Primary Examiner* — Lewis A Bullock, Jr.
*Assistant Examiner* — Christine Dang
(74) *Attorney, Agent, or Firm* — John R. Pivnichny; Law Office of Jim Boice

(57) ABSTRACT

A method, system and program product for providing execution feedback of peer submitted code snippets executed for correction of semantic errors in code. A first developer executing a code snippet to correct a semantic error in the use of a third-party library within a first IDE results in the transmission of an execution result to a collaboration datastore. If the code snippet execution completed with no errors, a result indicating a success is automatically transmitted by the IDE. Further, if the code snippet execution resulted in an error due to error within the code snippet, a result indicating code snippet failure along with error details is automatically transmitted. When a second developer is working on code within a second IDE that contains semantic errors, code snippets to correct the semantic error are presented to the second developer, ranked based on previous execution feedback provided by peer developers.

21 Claims, 5 Drawing Sheets

(56) References Cited

OTHER PUBLICATIONS

U.S. Appl. No. 12/195,362—Non-Final Office Action Mailed Jun. 28, 2012.
U.S. Appl. No. 12/195,368—Notice of Allowance Mailed May 7, 2012.
U.S. Appl. No. 13/486,567—Specification filed Jun. 1, 2012.
U.S. Appl. No. 12/195,362—Final Office Action Mailed Feb. 28, 2013.
U.S. Appl. No. 13/486,567—Non-Final Office Action Mailed Jun. 10, 2013.

* cited by examiner

RANKING PEER SUBMITTED CODE SNIPPETS USING EXECUTION FEEDBACK

FIELD OF THE INVENTION

The present invention relates to computer systems and software, and more specifically to an automated technique for correcting semantic errors in code using peer submitted code snippets, where the peer submitted code snippets are ranked based on feedback received from peer developers in an integrated development environment (IDE).

BACKGROUND OF THE INVENTION

Most application development activities are managed within an Integrated Development Environment (IDE). Besides relating to syntax, errors can also be related to code semantics. Typically, an IDE provides an editor that is configured to validate code syntax, highlight syntactic errors in a particular language and is configured to offer appropriate corrections for any syntax errors. Often, an IDE provides a rules engine used to highlight language semantic errors, which can be difficult to identify and to correct. As such, there is a need for an application developer to find ways to effectively monitor and correct such semantic errors during development of software.

SUMMARY OF THE INVENTION

In a first aspect, the invention provides a method for providing execution feedback of peer submitted code snippets executed for correction of semantic errors in code. The method includes identifying, in a syntax tree constructed for code inputted by a first developer into a first instance of a code editor in an integrated development environment, a node containing at least one semantic error pertaining to use of a third-party library, selecting, based on previous execution feedback provided by peer developers, a code snippet of one or more code snippets displayed for correcting the at least one semantic error for the node identified in the code to be executed, where the one or more code snippets displayed are associated with one or more collaboration records located for the node identified and where the one or more code snippets displayed are ranked based on execution feedback provided by peer developers for correcting the at least one semantic error, executing, using a code executor, the code inputted in the integrated development environment, determining whether or not the code snippet selected corrected the at least one semantic error for the node identified and, if the code snippet selected is determined not to have corrected the at least one semantic error, transmitting a new execution feedback conveying failure of the code snippet selected to correct the at least one semantic error. The method further includes receiving additional feedback from the peer developers for correcting the at least one semantic error when the code snippet does not correct the at least one semantic error identified and ranking the one or more code snippets displayed for correcting the at least one semantic error for the node identified using the additional feedback received from the peer developers. In an embodiment, the identifying step further includes inputting the code in the first instance of the code editor by the first developer in the integrated development environment and constructing, using a code parser of the integrated development environment, a syntax tree representation of the code inputted by the first developer. In an embodiment, the identifying step further includes providing a collaboration datastore for storing one or more collaboration records containing respective invocations for identifying the node, where a collaboration record includes one or more properties and where a respective invocation of the respective invocations includes a type of invocation and one or more parameters and creating a respective semantic error marker within the first instance of the code editor for the at least one semantic error identified using one or more collaboration records located for the node. In an embodiment, the selecting step further includes providing a code snippet processor for ranking the one or more code snippets displayed for correcting the at least one semantic error for the node identified using the any execution feedback received from a respective developer for the one or more code snippets executed for the one or more collaboration records located for the node identified, where a respective code snippet that has a higher successful usage is ranked higher than another respective code snippet with a lower successful usage, where a respective code snippet that has a successful usage is ranked higher than another respective code snippet that has some error occurrences within the code snippet and where a respective code snippet that has some error occurrences within the code snippet is ranked higher than another respective code snippet that has failed to correct a semantic error. In an embodiment, the determining step further includes determining whether or not the code snippet selected contains an error and, if the code snippet selected is determined to contain the error, transmitting error details to the collaboration datastore. In an embodiment, the method further includes executing additional code inputted into a second instance of the code editor by a second developer in the integrated development environment and identifying any nodes in the additional code to be executed that contains a semantic error pertaining to use of the third party library.

In another aspect the invention provides a computer system for providing execution feedback of peer submitted code snippets executed for correction of semantic errors in code. The computer system includes a central processing unit, first program instructions to identify, in a syntax tree constructed for code inputted by a first developer into a first instance of a code editor in an integrated development environment, a node containing at least one semantic error pertaining to use of a third-party library, second program instructions to select, based on previous execution feedback provided by peer developers, a code snippet of one or more code snippets displayed for correcting the at least one semantic error for the node identified in the code to be executed, where the one or more code snippets displayed are associated with one or more collaboration records located for the node identified and where the one or more code snippets displayed are ranked based on execution feedback provided by peer developers for correcting the at least one semantic error and third program instructions to execute, using a code executor, the code inputted in the integrated development environment, the third program instructions includes instructions to determine whether or not the code snippet selected corrected the at least one semantic error for the node identified and, if the code snippet selected is determined not to have corrected the at least one semantic error, the third program instructions includes instructions to transmit a new execution feedback conveying failure of the code snippet selected to correct the at least one semantic error and where the first, second and third program instructions are stored in the computer system for execution by the central processing unit. In an embodiment, the computer system further includes fourth program instructions to receive additional feedback from the peer developers for correcting the at least one semantic error when the code snippet does not correct the at least one semantic error identified, the fourth program instructions includes instructions to rank the one or more code snippets displayed for correcting the at least one semantic error for the node identified using the additional feedback received from the peer developers. In an embodiment, the second program instructions include instructions to provide a collaboration datastore for storing one or more collaboration records containing respective invocations for identifying the node, where a collaboration record includes one or more properties and where a respective invocation of the respective invocations includes a type of invocation and one or more parameters, the second program instructions includes instructions to create a respective semantic error marker within the first instance of the code editor for the at least one semantic error identified using one or more collaboration records located for the node. In an embodiment, the second program instructions include instructions to provide a code snippet processor for ranking the one or more code snippets displayed for correcting the at least one semantic error for the node identified using the any execution feedback received from a respective developer for the one or more code snippets executed for the one or more collaboration records located for the node identified, where a respective code snippet that has a higher successful usage is ranked higher than another respective code snippet with a lower successful usage, where a respective code snippet that has a successful usage is ranked higher than another respective code snippet that has some error occurrences within the code snippet and where a respective code snippet that has some error occurrences within the code snippet is ranked higher than another respective code snippet that has failed to correct a semantic error. In an embodiment, the third program instructions include instructions to determine whether or not the code snippet selected contains an error and, if the code snippet selected is determined to contain the error, the third program instructions includes instructions to transmit error details to the collaboration datastore. In an embodiment, the fourth program instructions include instructions to execute additional code inputted into a second instance of the code editor by a second developer in the integrated development environment and to identify any nodes in the additional code to be executed that contains a semantic error pertaining to use of the third party library. In an embodiment, each of the first, second, third and fourth program instructions are stored in the computer system for execution by the central processing unit.

In yet another aspect, the invention provides a computer program product for correcting semantic errors in code in an integrated development environment. The computer program product includes a computer readable medium, first program instructions to identify, in a syntax tree constructed for code inputted by a first developer into a first instance of a code editor in an integrated development environment, a node containing at least one semantic error pertaining to use of a third-party library and second program instructions to select, based on previous execution feedback provided by peer developers, a code snippet of one or more code snippets displayed for correcting the at least one semantic error for the node identified in the code to be executed, where the one or more code snippets displayed are associated with one or more collaboration records located for the node identified and where the one or more code snippets displayed are ranked based on execution feedback provided by peer developers for correcting the at least one semantic error and third program instructions to execute, using a code executor, the code inputted in the integrated development environment, the third program instructions includes instructions to determine whether or not the code snippet selected corrected the at least one semantic error for the node identified and, if the code snippet selected is determined not to have corrected the at least one semantic error, the third program instructions includes instructions to transmit a new execution feedback conveying failure of the code snippet selected to correct the at least one semantic error. In an embodiment, the computer program product further includes fourth program instructions to receive additional feedback from the peer developers for correcting the at least one semantic error when the code snippet does not correct the at least one semantic error identified, the fourth program instructions includes instructions to rank the one or more code snippets displayed for correcting the at least one semantic error for the node identified using the additional feedback received from the peer developers. In an embodiment, the second program instructions include instructions to provide a collaboration datastore for storing one or more collaboration records containing respective invocations for identifying the node, where a collaboration record includes one or more properties and where a respective invocation of the respective invocations includes a type of invocation and one or more parameters, the second program instructions includes instructions to create a respective semantic error marker within the first instance of the code editor for the at least one semantic error identified using one or more collaboration records located for the node. In an embodiment, the second program instructions include instructions to provide a code snippet processor for ranking the one or more code snippets displayed for correcting the at least one semantic error for the node identified using the any execution feedback received from a respective developer for the one or more code snippets executed for the one or more collaboration records located for the node identified, where a respective code snippet that has a higher successful usage is ranked higher than another respective code snippet with a lower successful usage, where a respective code snippet that has a successful usage is ranked higher than another respective code snippet that has some error occurrences within the code snippet and where a respective code snippet that has some error occurrences within the code snippet is ranked higher than another respective code snippet that has failed to correct a semantic error. In an embodiment, the third program instructions include instructions to determine whether or not the code snippet selected contains an error and, if the code snippet selected is determined to contain the error, the third program instructions includes instructions to transmit error details to the collaboration datastore. In an embodiment, the fourth program instructions include instructions to execute additional code inputted into a second instance of the code editor by a second developer in the integrated development environment and to identify any nodes in the additional code to be executed that contains a semantic error pertaining to use of the third party library. In an embodiment, each of the first, second, third and fourth program instructions are recorded on the computer readable medium.

Further, in yet another aspect, the invention provides a process for deploying computing infrastructure including integrating computer-readable code into a computing system, where the code in combination with the computing system is capable of performing a process of providing execution feedback of peer submitted code snippets executed for correction of semantic errors in code inputted in an integrated development environment. The process includes identifying, in a syntax tree constructed for code inputted by a first developer into a first instance of a code editor in an integrated development environment, a node containing at least one semantic error pertaining to use of a third-party library, selecting, based on previous execution feedback provided by peer developers, a code snippet of one or more code snippets displayed for correcting the at least one semantic error for the node identified in the code to be executed, where the one or more code snippets displayed are associated with one or more collaboration records located for the node identified and where the one or more code snippets displayed are ranked based on execution feedback provided by peer developers for correcting the at least one semantic error, executing, using a code executor, the code inputted in the integrated development environment, determining whether or not the code snippet selected corrected the at least one semantic error for the node identified, if the code snippet selected is determined not to have corrected the at least one semantic error, transmitting a new execution feedback conveying failure of the code snippet selected to correct the at least one semantic error, receiving additional feedback from the peer developers for correcting the at least one semantic error when the code snippet does not correct the at least one semantic error identified and ranking the one or more code snippets displayed for correcting the at least one semantic error for the node identified using the additional feedback received from the peer developers. In an embodiment, the identifying step further includes inputting the code in the first instance of the code editor by the first developer in the integrated development environment and constructing, using a code parser of the integrated development environment, a syntax tree representation of the code inputted by the first developer. In an embodiment, the identifying step further includes providing a collaboration datastore for storing one or more collaboration records containing respective invocations for identifying the node, where a collaboration record includes one or more properties and where a respective invocation of the respective invocations includes a type of invocation and one or more parameters and creating a respective semantic error marker within the first instance of the code editor for the at least one semantic error identified using one or more collaboration records located for the node. In an embodiment, the determining step further includes determining whether or not the code snippet selected contains an error and, if the code snippet selected is determined to contain the error, transmitting error details to the collaboration datastore. In an embodiment, the selecting step further includes providing a code snippet processor for ranking the one or more code snippets displayed for correcting the at least one semantic error for the node identified using the any execution feedback received from a respective developer for the one or more code snippets executed for the one or more collaboration records located for the node identified, where a respective code snippet that has a higher successful usage is ranked higher than another respective code snippet with a lower successful usage, where a respective code snippet that has a successful usage is ranked higher than another respective code snippet that has some error occurrences within the code snippet and where a respective code snippet that has some error occurrences within the code snippet is ranked higher than another respective code snippet that has failed to correct a semantic error. In an embodiment, the process further includes executing additional code inputted into a second instance of the code editor by a second developer in the integrated development environment and identifying any nodes in the additional code to be executed that contains a semantic error pertaining to use of the third party library.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Many of the functional units described in this specification have been referred to as modules or components, in order to more particularly emphasize their implementation independence. A module may be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set and may be distributed over different locations including over different storage devices and over disparate memory devices. Furthermore, modules may also be implemented as a combination of software and one or more hardware devices. For instance, a module may be embodied in the combination of a software executable code stored on a memory device. In a further example, a module may be the combination of a processor that operates on a set of operational data.

Figure 1:
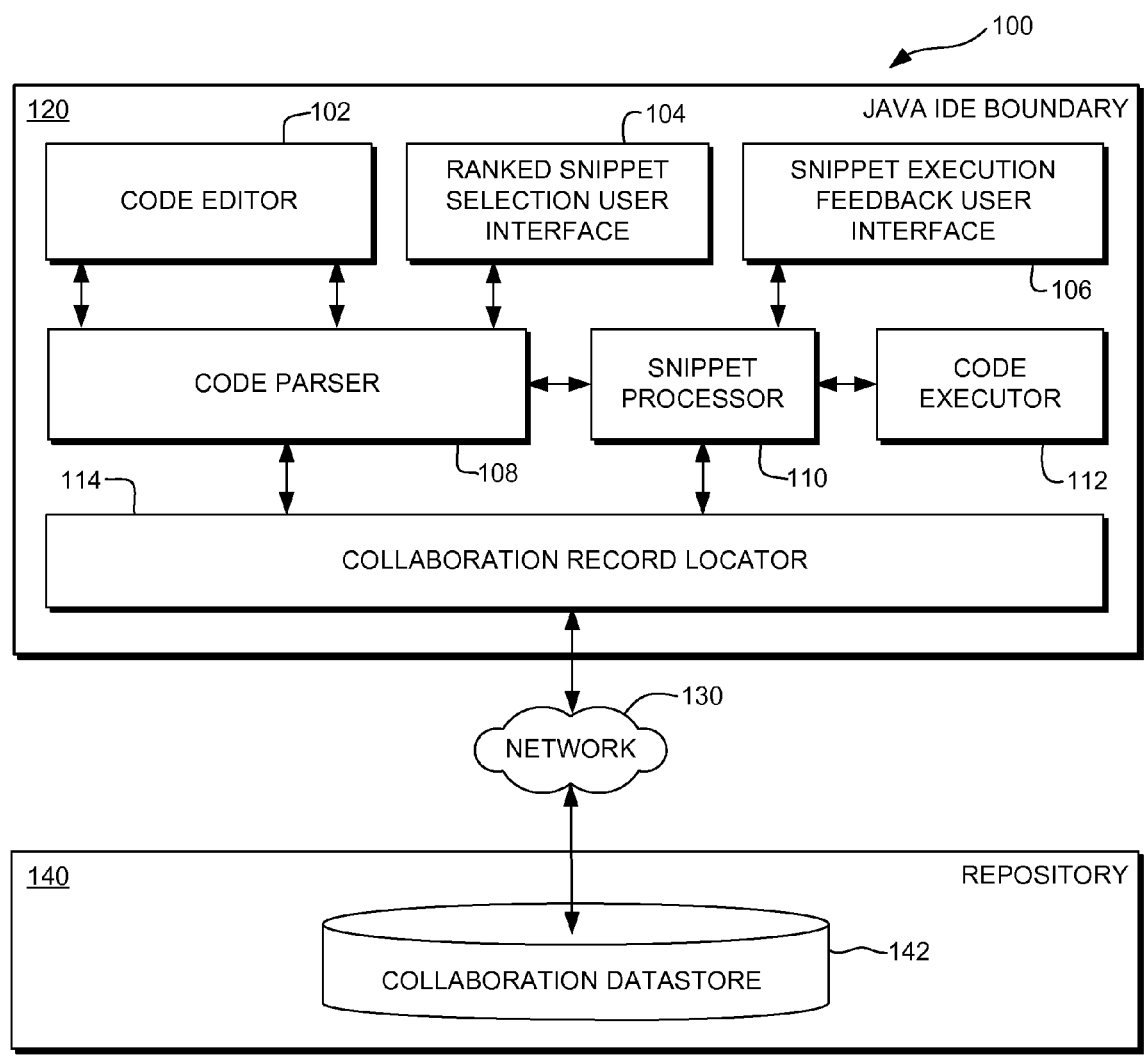
FIG. 1 is a schematic block diagram of a Java integrated development environment (IDE) for providing execution feedback of peer submitted code snippets executed for correction of semantic errors identified in code in the integrated development environment (IDE), in accordance with an embodiment of the present invention.

Reference is now made to FIG. 1, which illustrates an embodiment of a computer infrastructure 100, which includes an integrated development environment (IDE) 120 for providing execution feedback of peer submitted code snippets executed for correction of semantic errors identified in code in the integrated development environment (IDE) 120, in accordance with an embodiment of the invention. Turning to FIG. 1, FIG. 1 depicts a schematic block system diagram of one embodiment of a computer infrastructure 100, which illustrates an integrated development environment (IDE) for providing execution feedback of peer submitted code snippets executed for correcting semantic errors identified in code in the integrated development environment (IDE). In an embodiment, the integrated development environment (IDE) boundary 120 comprises an integrated development environment (IDE) software application that comprises one or more program modules or program components for providing execution feedback of peer submitted code snippets executed for correction of semantic errors identified in code being developed. In an embodiment, the IDE software application contains one or more code editors that an application developer may use to write code in a specific programming language. Besides providing a convenient interface to view and modify code, a code editor is able to validate code syntax, highlight syntactic errors and offer corrections. As shown in FIG. 1, the integrated development environment (IDE) boundary 120 comprises a Java integrated development environment (IDE) 120 for providing execution feedback of peer submitted code snippets executed for correction of semantic errors identified in code inputted into an integrated development environment (IDE). A semantic error occurs when code violates the semantics of the underlying language or violates use of a third-party library. As depicted in FIG. 1, the Java integrated development environment (IDE) boundary 120 includes a code editor component 102 (simply referred to herein after as "code editor"), a ranked snippet selection user interface component 104 (simply referred to herein after as "snippet selection user interface"), a snippet execution feedback user interface component 106 (simply referred to herein after as "snippet feedback user interface"), a code parser component 108 (simply referred to herein after as "code parser"), a snippet processor component 110 (simply referred to herein after as "snippet processor"), a code executor component 112 (simply referred to herein after as "code executor"), and a collaboration record locator component 114 (simply referred to herein after as "collaboration record locator"). The code editor 102 is used by a programmer or developer to input or enter code. As a developer enters code into the code editor 102, the code parser 108 reads and parses the entered code. Further, the code parser 108 constructs an Abstract Syntax Tree (AST) representation of the code inputted in the code editor 102. The collaboration record locator 114 provides an interface to a collaboration datastore 142. In an embodiment, the collaboration record locator 114 uses the AST constructed by the code parser 108 to locate one or more collaboration records stored or maintained in the collaboration datastore 142 within a repository 140. In an embodiment, the collaboration datastore 142 is located in a remote repository 140 and is accessed over a network 130. However, it is understood that the collaboration datastore 142 may be located in a local repository within integrated development environment (IDE) 120, where each developer may have access to their own local datastore, and where the datastores may be configured to update each other via replication. Further, the snippet processor 110 within the integrated development environment (IDE) 120 maintains respective locations of actual code snippets submitted by peer developers. In an embodiment, the snippet processor 110 also maintains code snippet selections and code snippet configurations. The code executor 112 runs the developer code in the IDE and uses the snippet processor 110 to invoke the code snippet or code snippets selected by the developer. Further, in an embodiment, the snippet processor 110 automatically transmits results of the execution of the code snippets to the Collaboration Datastore 142. In an alternate embodiment, the developer may provide execution feedback using the snippet execution feedback user interface 106. The ranked snippet selection user interface 104, in an embodiment, provides the developer with matching code snippets ordered based on the feedback received from peer developers. The system 100 includes a Java integrated development environment (IDE) boundary 120, which is intended to represent any type of computer architecture that is maintained in a secure environment (i.e., for which access control is enforced). It should be understood, however, that although not shown, other hardware and software components (e.g., compiler, debugger, additional computer systems, routers, firewalls, etc.) could be included in system 100. However, it is understood by one skilled in the art that the invention may be used in conjunction with other programming languages for providing execution feedback of peer submitted code snippets executed for correction of semantic errors identified due to use of third party libraries.

Upon execution of developer code within the IDE 120, the snippet processor 110 monitors results of any code snippet executions. Outcomes of such code snippet executions may fall into one of three scenarios. First, the code snippet execution may show that the code snippet executed successfully with no execution errors. Second, the code snippet execution may indicate an error in execution of the code snippet. Third, the code snippet execution may indicate that the code snippet executed successfully, but that the code snippet failed to correct the semantic error identified in the developer's code. In case of the first and second scenarios mentioned above, the snippet processor 110 monitors and captures the execution of one or more code snippets selected by the developer for providing execution feedback of peer submitted code snippets executed for correction of semantic errors identified in the code. When execution of the code snippet is completed, the snippet processor 110 automatically transmits execution results of the code snippets back to the collaboration datastore 142. In a preferred embodiment, the transmission or communication contains an identifier that uniquely identifies the IDE instance among several instances. Further, the IDE retains historic trace of such transmissions to ensure that the same details are not transmitted multiple times. Accordingly, for a successful execution, as identified in scenario 1 above, a notification indicating that the code snippet was executed successfully is transmitted to the collaboration datastore 142. However, if an error occurs within the code snippet itself, as identified in scenario 2 above, error information, including error details and error location are transmitted to the collaboration datastore 142. Further, in case of scenario 3 above, where the code snippet is executed successfully, but the code snippet, in actuality, failed to correct the semantic error, the outcome of the execution of the code snippet may not be reliably automatically determined. As such, the computer system 100 provides the developer the ability to manually submit feedback for the code snippet to the collaboration datastore 142, using the snippet execution feedback user interface 106.

Figure 2:
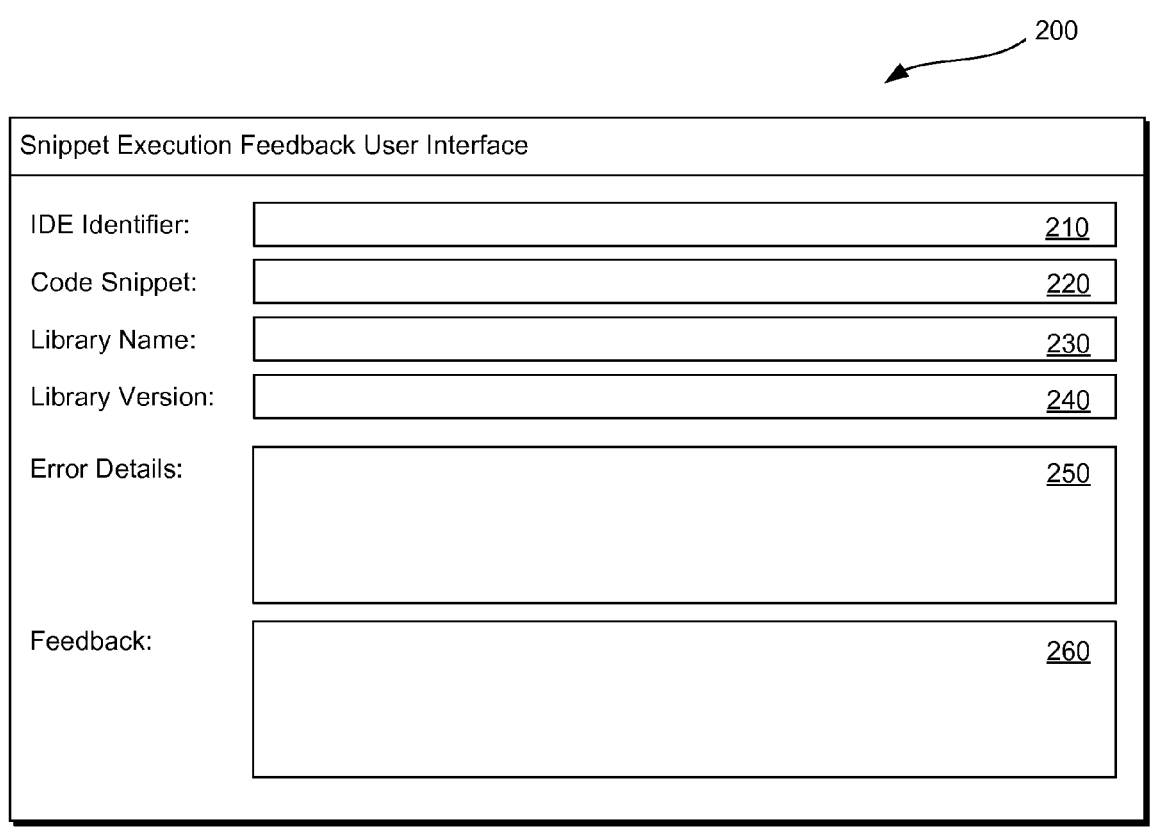
FIG. 2 depicts an illustration of an embodiment of a snippet execution feedback user interface within a Java integrated development environment (IDE) for manual submission of execution feedback of peer submitted code snippets executed for correction of semantic errors identified in code in the integrated development environment (IDE), in accordance with an embodiment of the present invention.

Reference is now made to FIG. 2, reference numeral 200, which illustrates an embodiment of a snippet execution feedback user interface within a Java integrated development environment (IDE) for manual submission of execution feedback of peer submitted code snippets executed for correction of semantic errors identified in code in the integrated development environment (IDE), in accordance with an embodiment of the present invention. As shown in FIG. 2, the snippet execution feedback user interface 200 is used by a developer to submit feedback in the case or scenario where the code snippet executed without error, but failed to correct the semantic error. As shown in FIG. 2, the snippet execution feedback user interface 200 comprises of the fields: IDE Identifier 210, Code Snippet 220, Library Name 230, Library Version 240, Error Details 250 and Feedback 260. In an embodiment, the IDE Identifier field 210 uniquely identifies an instance of an integrated development environment (IDE) from other instances of the IDE. In an embodiment, the Code Snippet field 220 uniquely identifies the code snippet. In an embodiment, the Library Name field 230 indicates the third party library where the semantic error occurred, which the code snippet was meant to correct. In an embodiment, the Library Version field 240 indicates or specifies the specific version of the third party library. In an embodiment, the Error Details field 250 can be used to supply technical error information to the collaboration datastore, such as, a stack trace. In an embodiment, the Feedback field 260 may be used to enter any textual feedback from a developer to a peer developer who contributed the code snippet. Accordingly, when a second developer is using a second instance of the IDE to enter code and encounters the same semantic error, peer submitted code snippets can be ranked based on feedback collected or received from other peer developers. In an embodiment, the code snippets are ranked in one of three ways by the ranked snippet selection user interface. First, a code snippet that has a higher successful usage is ranked higher than a code snippet with a lower successful usage. Second, a code snippet that has a successful usage is ranked higher than a code snippet that has some error occurrences within the code snippet. Third, a code snippet that has some error occurrences within the code snippet is ranked higher than a code snippet that failed to correct the semantic error it was meant to correct.

Figure 3A:
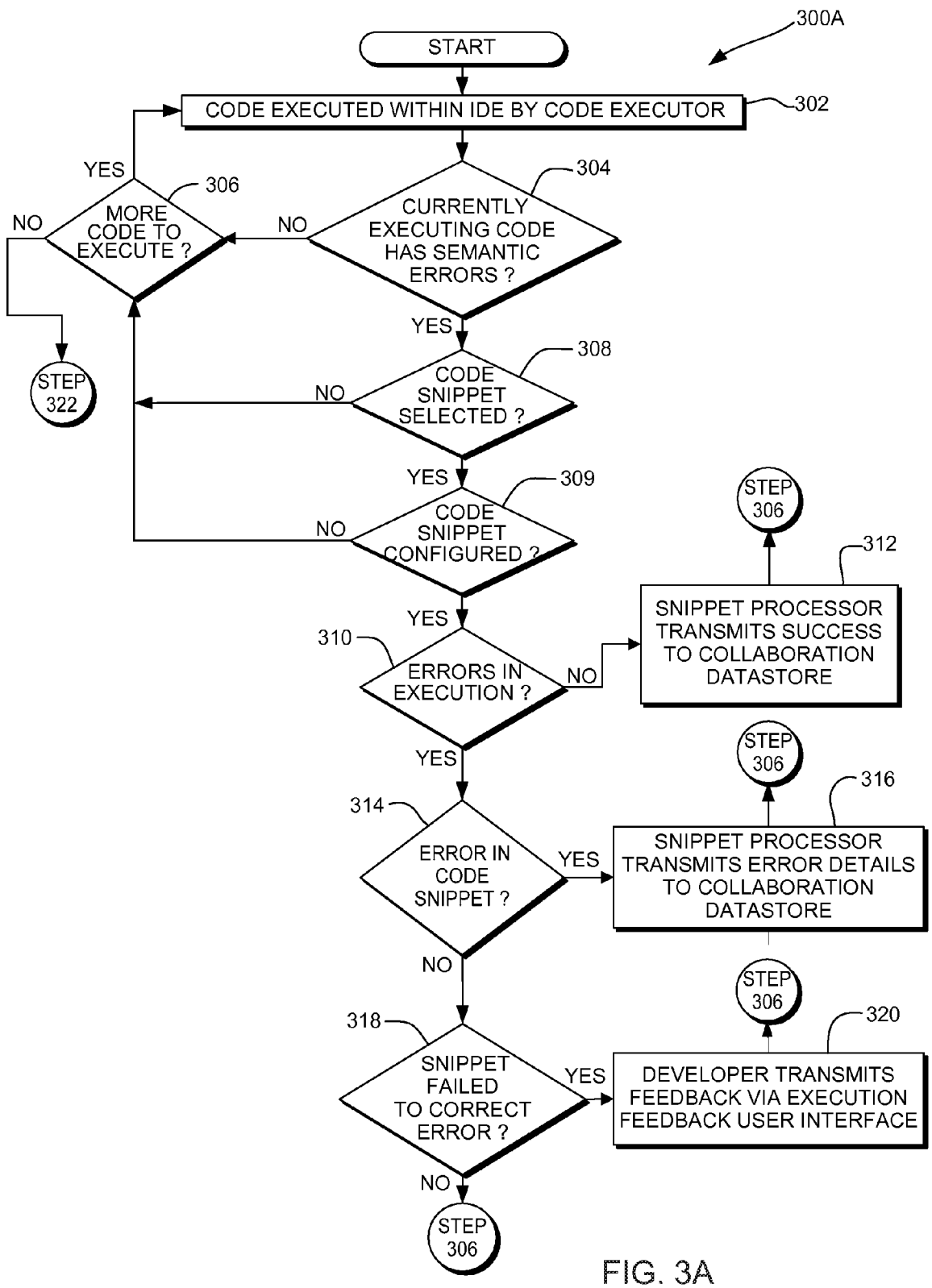
FIGS. 3A-3B together depict a flowchart outlining the steps performed for providing execution feedback of peer submitted code snippets executed for correcting semantic errors identified in code in an integrated development environment (IDE), in accordance with an embodiment of the present invention.

In another embodiment, the invention provides a method for providing execution feedback of peer submitted code snippets executed for correcting semantic errors identified in code in an integrated development environment (IDE), where peer developers can edit code in respective code editors within respective IDEs and the execution feedback provided by these peer developers can be used by a developer to correct semantic errors identified in code being developed by yet another developer using yet another IDE, in accordance with an embodiment of the present invention. Further, in yet another embodiment, the invention provides a process for deploying computing infrastructure including integrating computer-readable code into a computing system, wherein the code in combination with the computing system is capable of performing a process of providing execution feedback of peer submitted code snippets executed for correcting semantic errors identified in code in an integrated development environment (IDE). Reference is now made to respective flowcharts 300A and 300B shown in FIGS. 3A and 3B, which together outline a method for providing execution feedback of peer submitted code snippets executed for correcting semantic errors identified in code in an integrated development environment (IDE). Turning to FIG. 3A, reference numeral 300A, the method for providing execution feedback of peer submitted code snippets executed for correcting semantic errors identified in code in an integrated development environment (IDE) begins at step 302 with the code executor executing code inputted by a developer into a code editor within the integrated development environment. The code executor determines, in step 304, whether or not the developer code being currently executed contains any semantic errors. If the code executor determines that the code being currently executed does not contain any semantic errors, then the code executor further determines in step 306 whether or not there is more code to be executed. If there is more code to be executed in step 306, then the code executor returns to step 302 and executes additional code inputted by the developer. If there is no additional code to be executed in step 306, then the process continues with step 322, as explained herein below. However, if the code executor determines in step 304 that the code being executed does contain semantic errors, then the code executor determines, in step 308, whether or not a code snippet has been selected to correct any identified semantic errors in the code. If the code executor determines in step 308 that a code snippet has not been selected to correct an identified semantic error in the code, then the process returns to step 306, where the code executor determines whether or not there is more code that needs to be executed. However, if in step 308 the code executor determines that a code snippet has been selected to correct any identified semantic errors in the code, then the code executor determines in step 309 whether or not the code snippet has been configured to correct an identified semantic error in the code. If the code executor determines that a code snippet has not been configured to correct an identified semantic error in the code, then the process returns to step 306, where the code executor determines whether or not there is more code that needs to be executed. However, if in step 309 the code executor determines that a code snippet has been configured to correct an identified semantic error in the code, then the code executor executes the code snippet. Further, the code executor determines in step 310 whether or not there are any errors in the execution of the code snippets selected. If the code executor determines that the code snippet selected executed without any errors, then the snippet processor communicates in step 312 the success of the code snippet execution to the collaboration datastore and the process continues with step 306, where the code executor determines whether or not there is more code to be executed. However, on the other hand, if the code executor determines that there are errors in the execution of the code snippet in step 310, then the code executor further determines in step 314 whether or not the error in execution is caused by errors within the actual code snippet itself. If the code executor determines that the error in execution is caused by errors within the actual code snippet itself, then the snippet processor, which monitors execution of the code snippet, communicates in step 316 the error details of the code snippet execution to the collaboration datastore and the process continues with step 306, where the code executor determines whether or not there is more code to be executed. However, in step 314, if the code executor determines that there are no errors within the actual code snippet itself, then in step 318 a determination is made as to whether the code failed because the code snippet failed to correct the semantic error or because of some other reason. If the determination in step 318 is that the code snippet failed to correct the semantic error, then the developer uses the snippet execution feedback user interface (discussed herein above with respect to FIG. 2) to transmit in step 320 execution feedback to the collaboration datastore and the process continues with step 306, where the code executor determines whether or not there is more code to be executed. Going back to step 306, if the code executor determines in step 306 that there is no more code to execute, then the process moves to step 322 in FIG. 3B.

Figure 3B:
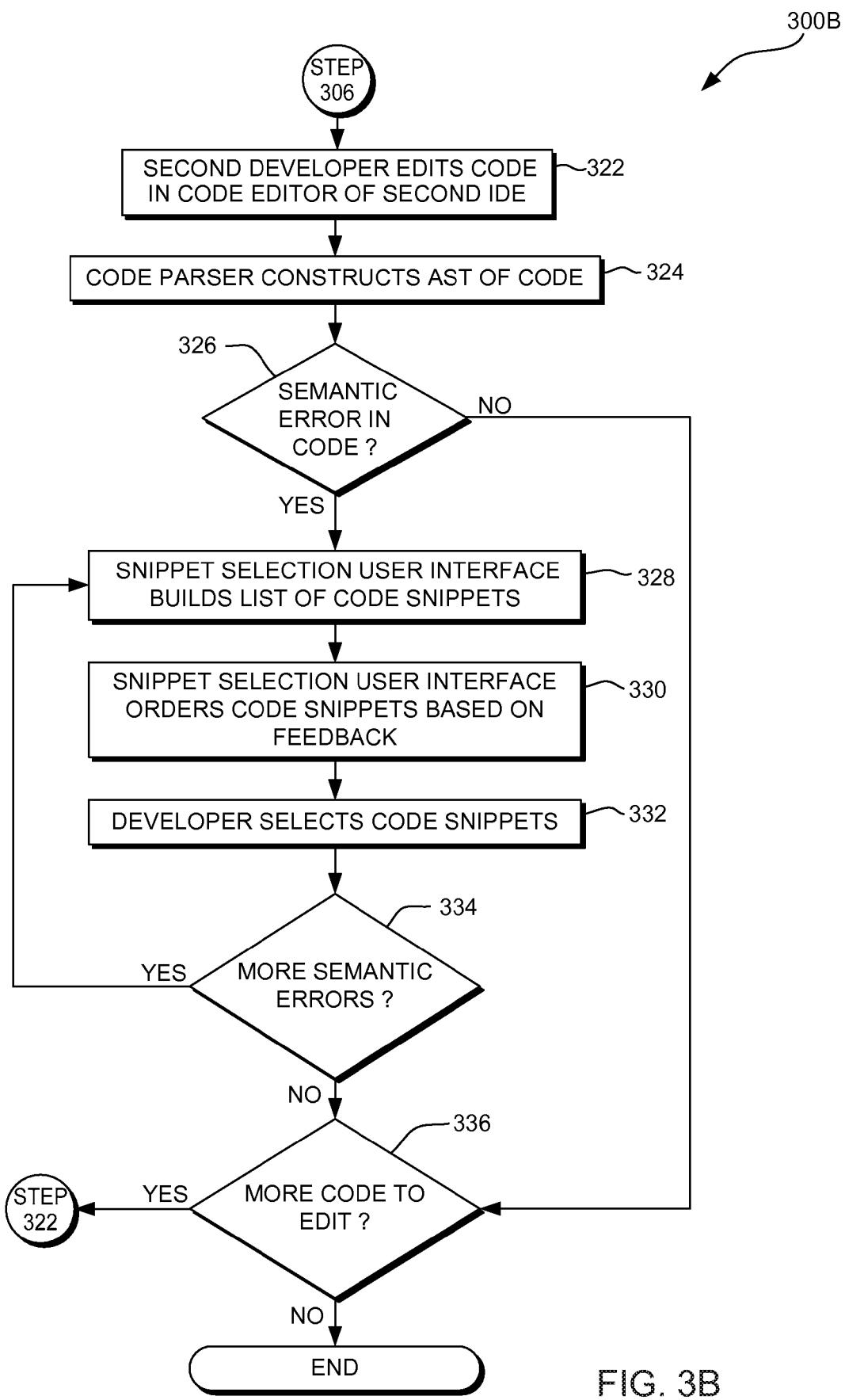

Turning to FIG. 3B, reference numeral 300B, in step 322, a second developer edits code in a code editor of a second integrated development environment (IDE. Further, in step 324, the code parser within the second IDE constructs an AST of the code inputted by the second developer. The code parser determines in step 326 whether or not there are any semantic errors identified in the code inputted by the second developer. If the code parser determines in step 326 that there are semantic errors in the code, then in step 328, the ranked snippet selection user interface builds and displays a list of the available code snippets for correcting any semantic errors identified. In step 330, the snippet selection user interface orders the code snippets and displays the code snippets based on the execution feedback provided by one or more peer developers. As discussed herein above, a code snippet is ranked in one of three ways. First, a code snippet that has a higher successful usage is ranked higher than a code snippet with a lower successful usage. Second, a code snippet that has a successful usage is ranked higher than a code snippet that has some error occurrences within the code snippet. Third, a code snippet that has some error occurrences within the code snippet is ranked higher than a code snippet that failed to correct the semantic error it was meant to correct. Further, in step 332 shown in FIG. 3B, the developer selects one or more code snippets that are ranked. In step 334, the code parser determines whether or not any more semantic errors are identified. If the code parser determines that more semantic errors are identified in step 334, then the process goes back to step 328 and steps 328, 330, 332 and 334 are repeated, as necessary. However, if in step 334, the code parser determines that there are no more semantic errors, then the process continues with step 336, where a determination is made by the code parser as to whether or not there is more code for the code editor to edit. If it is determined that there is more code to edit in step 336, then the process returns to step 322, where the code parser edits code inputted in the second IDE. However, if there is no more code to edit, then the process ends.

Figure 4:
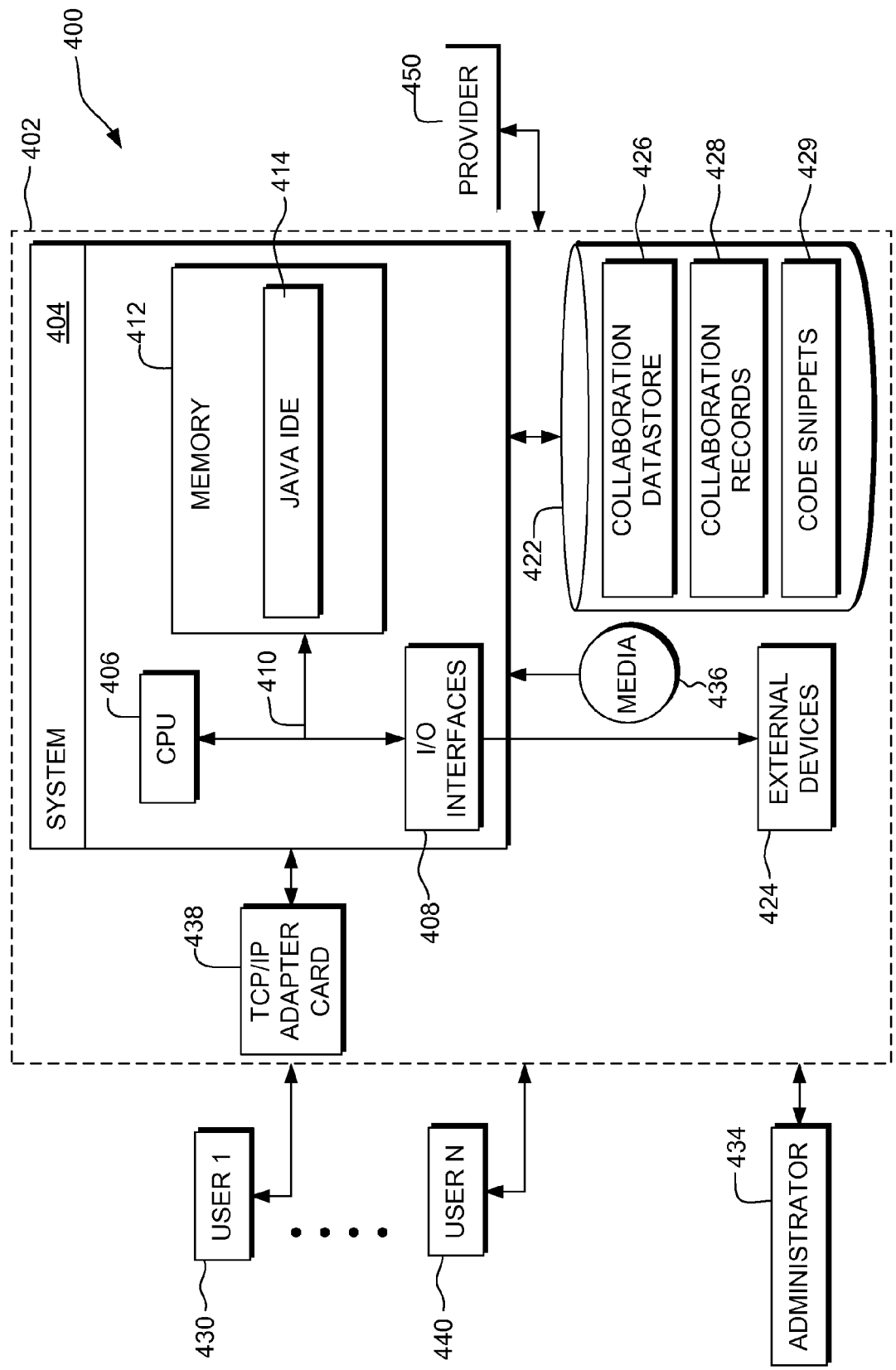
FIG. 4 is a schematic block system diagram of an integrated development environment (IDE), such as, a Java IDE for providing execution feedback of peer submitted code snippets executed for correcting semantic errors identified in code in the integrated development environment (IDE), in accordance with an embodiment of the present invention.

Referring now to FIG. 4, there is illustrated a computer system 400 that includes a computer infrastructure 402 having a computer program product configured to provide execution feedback of peer submitted code snippets executed for correcting semantic errors identified in code in the integrated development environment (IDE), in accordance with an embodiment of the present invention. The computer program product comprises a computer readable or computer-usable storage medium, which provides program code, such as, the Java integrated development environment (IDE) application 414 for providing execution feedback of peer submitted code snippets executed for correcting semantic errors identified in code in the integrated development environment (IDE). The Java integrated development environment (IDE) application 414 can be loaded into computer system 404 from a type of computer readable storage media 436, such as, a magnetic tape or disk, optical media, DVD, memory stick, semiconductor memory, etc. or downloaded from the Internet via a TCP/IP adapter card 438. As depicted in FIG. 4, system 400 includes a computer infrastructure 402, which is intended to represent any type of computer architecture that is maintained in a secure environment (i.e., for which access control is enforced). As shown, infrastructure 402 includes a computer system 404 that typically represents an application server or system 404 or the like that includes a integrated development environment (IDE) for developing software, such as the Java integrated development environment (IDE) 414 configured to correct semantic errors in code under development. It should be understood, however, that although not shown, other hardware and software components (e.g., additional computer systems, routers, firewalls, etc.) could be included in infrastructure 402.

In general, user 1 (reference numeral 430) through user N (reference numeral 440) may access the computer system 404, which has deployed thereon the Java integrated development environment (IDE) application 414, which implements the invention. As shown in FIG. 4, the system 404 (which has implemented thereon the Java integrated development environment (IDE) application 414) is shown to include a collaboration datastore 426 that has stored therein one or more collaboration records 428 used for correcting semantic errors in code, by selecting peer submitted code snippets 429 that are ranked based on execution feedback received from peer developers in an integrated development environment (IDE). In particular, a developer or programmer (user 1, reference numeral 430 through user N, reference numeral 440) accesses the Java integrated development environment (IDE) application 414 running on system 404 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wireless Fidelity) or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as a third party provider 450, or by an independent entity. Regardless, use of infrastructure 402 and the teachings described herein could be offered to the parties on a subscription or fee-basis. In either scenario, an administrator 434 could support and configure infrastructure 402, for instance, upgrading the Java IDE application 414 deployed on the computer system 404.

The computer system 404 is shown to include a CPU (hereinafter "processing unit 406"), a memory 412, a bus 410, and input/output (I/O) interfaces 408. Further, the computer system 404 is shown in communication with external I/O devices/resources 424 and storage system 422. In general, processing unit 406 executes computer program code, such as the Java integrated development environment (IDE) application 414 for correcting semantic errors within code being developed, using execution feedback of code snippets provided by peer developers. While executing computer program code, the processing unit 406 can read and/or write data to/from memory 412, storage system 422, and/or I/O interfaces 408. For instance, in one embodiment, the Java integrated development environment (IDE) application 414 stores collaboration records 428 within storage 422. Alternatively, the data stored in storage 422 may be stored in a separate storage within the system 404. Bus 410 provides a communication link between each of the components in computer system 400, such that information can be communicated within the infrastructure 402. External devices 424 can comprise any devices (e.g., keyboard, pointing device, display, etc.) that enable a user (developer or programmer) to interact with computer system 400 and/or any devices (e.g., network card, modem, etc.) that enable server 404 to communicate with one or more other computing devices.

Computer infrastructure 402 is only illustrative of various types of computer infrastructures for implementing the invention. For example, in an embodiment shown, computer infrastructure e 402 comprises two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or storage system(s) 422 could be contained within computer system 404, and not externally as shown. Storage system 422 can be any type of system (e.g., a database) capable of providing storage for information under the present invention, such as the collaboration records 428 stored in the collaboration datastore 426. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Accordingly, the invention provides a system, method, computer program product and a process for correcting semantic errors by using execution feedback provided by peer developers for correcting semantic errors identified in the use of third-party libraries In particular, execution of a code snippet by a first developer within a first IDE to correct a semantic error in the use of a third-party library results in the transmission of an execution result to the collaboration datastore. If the snippet execution completed with no errors, a result indicating a success is automatically transmitted by the IDE. Alternatively, if the execution resulted in an error within the code snippet, a result indicating snippet failure along with error details is automatically transmitted. Finally, if the snippet failed to correct the semantic error, the first developer may transmit a failure status with execution feedback. When a second developer is working on code within a second IDE that contains semantic errors, code snippets to correct the error are presented ranked based on the execution feedback provided by peer developers, such as, the first developer.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing execution feedback of peer submitted executable code snippets executed for correction of semantic errors in code, said method comprising the steps of:
   identifying, in a syntax tree constructed for code inputted by a first developer into a first instance of a code editor in an integrated development environment, a node containing at least one semantic error pertaining to use of a third-party library, wherein said identifying provides a collaboration datastore for storing one or more collaboration records containing respective invocations for identifying said node, and wherein a respective invocation of said respective invocations includes a type of invocation and one or more parameters of an invocation;
   creating a respective semantic error marker within said first instance of said code editor for said at least one semantic error identified using one or more collaboration records located for said node;
   selecting, based on previous execution feedback provided by peer developers, an executable code snippet of one or more executable code snippets displayed for correcting said at least one semantic error for said node identified in said code to be executed, wherein said one or more executable code snippets displayed are associated with one or more collaboration records located for said node identified, wherein an execution feedback from said peer developers comprises a description of an execution result caused by executing a particular executable code snippet to correct a semantic error in particular code from the third-party library, wherein a first executable code snippet that has a higher success rate for correcting an error is ranked higher than a second executable code snippet that has a lower success rate than the first executable code snippet for correcting the error, and wherein said one or more executable code snippets displayed are ranked based on said previous execution feedback provided by peer developers for correcting said at least one semantic error;
   executing, using a code executor, said code inputted in said integrated development environment and said executable code snippet;
   automatically transmitting results of execution of the executable code snippet to the collaboration datastore;
   determining whether or not said executable code snippet selected corrected said at least one semantic error for said node identified;

if said executable code snippet selected is determined not to have corrected said at least one semantic error, transmitting a new execution feedback conveying failure of said executable code snippet selected to correct said at least one semantic error;

constructing, by a code parser, an Abstract Syntax Tree (AST) representation of the code inputted in the code editor;

providing, by a collaboration record locator, an interface to the collaboration datastore; and utilizing the AST constructed by the code parser to locate one or more collaboration records stored in the collaboration datastore.

2. The method according to claim 1, further comprising the steps of:

receiving additional feedback from said peer developers for correcting said at least one semantic error when said executable code snippet does not correct said at least one semantic error identified; and ranking said one or more executable code snippets displayed for correcting said at least one semantic error for said node identified using said additional feedback received from said peer developers.

3. The method according to claim 1, wherein said identifying step further comprises the steps of:

inputting said code in said first instance of said code editor by said first developer in said integrated development environment; and constructing, using a code parser of said integrated development environment, a syntax tree representation of said code inputted by said first developer.

4. The method according to claim 1, wherein said selecting step further comprises the step of:

providing a code snippet processor for ranking said one or more executable code snippets displayed for correcting said at least one semantic error for said node identified using any execution feedback received from a respective developer for said one or more executable code snippets executed for said one or more collaboration records located for said node identified, wherein a first executable code snippet that has a higher successful usage is ranked higher than a second executable code snippet with a lower successful usage, wherein the first executable code snippet that has a successful usage is ranked higher than the second executable code snippet that has some error occurrences within said second executable code snippet, and wherein the second executable code snippet that has some error occurrences within said second executable code snippet is ranked higher than a third executable code snippet that has failed to correct a semantic error.

5. The method according to claim 1, wherein said determining step further comprises the steps of:

determining whether or not said executable code snippet selected contains an error; and if said executable code snippet selected is determined to contain said error, transmitting error details to said collaboration datastore.

6. The method according to claim 5, further comprising the steps of:

executing additional code inputted into a second instance of said code editor by a second developer in said integrated development environment; and identifying any nodes in said additional code to be executed that contains a semantic error pertaining to use of said third party library.

7. A computer system for providing execution feedback of peer submitted executable code snippets executed for correction of semantic errors in code, said computer system comprising:

a central processing unit;

first program instructions to identify, in a syntax tree constructed for code inputted by a first developer into a first instance of a code editor in an integrated development environment, a node containing at least one semantic error pertaining to use of a third-party library, wherein said first program instructions provide a collaboration datastore for storing one or more collaboration records containing respective invocations for identifying said node, wherein a respective invocation of said respective invocations includes a type of invocation and one or more parameters of an invocation, and wherein said first program instructions create a respective semantic error marker within said first instance of said code editor for said at least one semantic error identified using one or more collaboration records located for said node;

second program instructions to select, based on previous execution feedback provided by peer developers, an executable code snippet of one or more executable code snippets displayed for correcting said at least one semantic error for said node identified in said code to be executed, wherein said one or more executable code snippets displayed are associated with one or more collaboration records located for said node identified, wherein an execution feedback from said peer developers comprises a description of an execution result caused by executing a particular executable code snippet to correct a semantic error in particular code from the third-party library, wherein a first executable code snippet that has a higher success rate for correcting an error is ranked higher than a second executable code snippet that has a lower success rate than the first executable code snippet for correcting the error, and wherein said one or more executable code snippets displayed are ranked based on said previous execution feedback provided by peer developers for correcting said at least one semantic error;

third program instructions to execute, using a code executor, said code inputted in said integrated development environment and said executable code snippet, said third program instructions including instructions to automatically transmit results of execution of the executable code snippet to the collaboration datastore, said third program instructions including instructions to determine whether or not said executable code snippet selected corrected said at least one semantic error for said node identified and if said executable code snippet selected is determined not to have corrected said at least one semantic error, said third program instructions including instructions to transmit a new execution feedback conveying failure of said executable code snippet selected to correct said at least one semantic error;

fourth program instructions to construct, by a code parser, an Abstract Syntax Tree (AST) representation of the code inputted in the code editor;

fifth program instructions to provide, by a collaboration record locator, an interface to the collaboration datastore; and sixth program instructions to utilize the AST constructed by the code parser to locate one or more collaboration records stored in the collaboration datastore, and wherein said first, second, third, fourth, fifth, and sixth program instructions are stored in said computer system for execution by said central processing unit.

8. The computer system according to claim 7, further comprising:
seventh program instructions to receive additional feedback from said peer developers for correcting said at least one semantic error when said executable code snippet does not correct said at least one semantic error identified, said fourth program instructions including instructions to rank said one or more executable code snippets displayed for correcting said at least one semantic error for said node identified using said additional feedback received from said peer developers, and wherein said seventh program instructions are stored in said computer system for execution by said central processing unit.

9. The computer system according to claim 7, wherein said second program instructions include instructions to provide a code snippet processor for ranking said one or more executable code snippets displayed for correcting said at least one semantic error for said node identified using any execution feedback received from a respective developer for said one or more executable code snippets executed for said one or more collaboration records located for said node identified, wherein a first executable code snippet that has a higher successful usage is ranked higher than a second executable code snippet with a lower successful usage, wherein the first executable code snippet that has a successful usage is ranked higher than the second executable code snippet that has some error occurrences within said second executable code snippet, and wherein the second executable code snippet that has some error occurrences within said second executable code snippet is ranked higher than a third executable code snippet that has failed to correct a semantic error.

10. The computer system according to claim 9, wherein said third program instructions include instructions to determine whether or not said executable code snippet selected contains an error and if said code executable snippet selected is determined to contain said error, said third program instructions including instructions to transmit error details to said collaboration datastore.

11. The computer system according to claim 8, wherein said seventh program instructions include instructions to execute additional code inputted into a second instance of said code editor by a second developer in said integrated development environment and to identify any nodes in said additional code to be executed that contains a semantic error pertaining to use of said third party library.

12. A computer program product for providing execution feedback of peer submitted code snippets executed for correction of semantic errors in code inputted in an integrated development environment, said computer program product comprising:
a non-transitory computer readable medium;
first program instructions to identify, in a syntax tree constructed for code inputted by a first developer into a first instance of a code editor in an integrated development environment, a node containing at least one semantic error pertaining to use of a third-party library, wherein said first program instructions provide a collaboration datastore for storing one or more collaboration records containing respective invocations for identifying said node, wherein a respective invocation of said respective invocations includes a type of invocation and one or more parameters of an invocation, and wherein said first program instructions create a respective semantic error marker within said first instance of said code editor for said at least one semantic error identified using one or more collaboration records located for said node;
second program instructions to select, based on previous execution feedback provided by peer developers, an executable code snippet of one or more executable code snippets displayed for correcting said at least one semantic error for said node identified in said code to be executed, wherein said one or more executable code snippets displayed are associated with one or more collaboration records located for said node identified, wherein an execution feedback from said peer developers comprises a description of an execution result caused by executing a particular executable code snippet to correct a semantic error in particular code from the third-party library, wherein a first executable code snippet that has a higher success rate for correcting an error is ranked higher than a second executable code snippet that has a lower success rate than the first executable code snippet for correcting the error, and wherein said one or more executable code snippets displayed are ranked based on said previous execution feedback provided by peer developers for correcting said at least one semantic error;
third program instructions to execute, using a code executor, said code inputted in said integrated development environment and said executable code snippet, said third program instructions including instructions to automatically transmit results of execution of the executable code snippet to the collaboration datastore, said third program instructions including instructions to determine whether or not said executable code snippet selected corrected said at least one semantic error for said node identified and if said executable code snippet selected is determined not to have corrected said at least one semantic error, said third program instructions including instructions to transmit a new execution feedback conveying failure of said executable code snippet selected to correct said at least one semantic error;
fourth program instructions to construct, by a code parser, an Abstract Syntax Tree (AST) representation of the code inputted in the code editor;
fifth program instructions to provide, by a collaboration record locator, an interface to the collaboration datastore; and
sixth program instructions to utilize the AST constructed by the code parser to locate one or more collaboration records stored in the collaboration datastore, and wherein said first, second, third, fourth, fifth, and sixth program instructions are recorded on said non-transitory computer readable medium.

13. The computer program product according to claim 12, further comprising:
seventh program instructions to receive additional feedback from said peer developers for correcting said at least one semantic error when said executable code snippet does not correct said at least one semantic error identified, said fourth program instructions including instructions to rank said one or more executable code snippets displayed for correcting said at least one semantic error for said node identified using said additional feedback received from said peer developers, and wherein said seventh program instructions are recorded on said non-transitory computer readable medium.

14. The computer program product according to claim 12, wherein said second program instructions include instructions to provide a code snippet processor for ranking said one or more executable code snippets displayed for correcting said at least one semantic error for said node identified using said any execution feedback received from a respective developer for said one or more executable code snippets executed for said one or more collaboration records located for said node identified, wherein a first executable code snippet that has a higher successful usage is ranked higher than a second executable code snippet with a lower successful usage, wherein the first executable code snippet that has a successful usage is ranked higher than the second executable code snippet that has some error occurrences within said second executable code snippet, and wherein the second executable code snippet that has some error occurrences within said second executable code snippet is ranked higher than a third executable code snippet that has failed to correct a semantic error.

15. The computer program product according to claim 14, wherein said third program instructions include instructions to determine whether or not said executable code snippet selected contains an error and if said executable code snippet selected is determined to contain said error, said third program instructions including instructions to transmit error details to said collaboration datastore.

16. The computer program product according to claim 13, wherein said seventh program instructions include instructions to execute additional code inputted into a second instance of said code editor by a second developer in said integrated development environment and to identify any nodes in said additional code to be executed that contains a semantic error pertaining to use of said third party library.

17. A process for deploying computing infrastructure comprising integrating computer-readable code into a computing system, wherein said code in combination with said computing system is capable of performing a process of providing execution feedback of peer submitted code snippets executed for correction of semantic errors in code inputted in an integrated development environment, said process comprising:
  identifying, in a syntax tree constructed for code inputted by a first developer into a first instance of a code editor in an integrated development environment, a node containing at least one semantic error pertaining to use of a third-party library, wherein said identifying provides a collaboration datastore for storing one or more collaboration records containing respective invocations for identifying said node, and wherein a respective invocation of said respective invocations includes a type of invocation and one or more parameters of an invocation;
  creating a respective semantic error marker within said first instance of said code editor for said at least one semantic error identified using one or more collaboration records located for said node;
  selecting, based on previous execution feedback provided by peer developers, a code snippet of one or more code snippets displayed for correcting said at least one semantic error for said node identified in said code to be executed, wherein said one or more code snippets displayed are associated with one or more collaboration records located for said node identified, wherein an execution feedback from said peer developers comprises a description of an execution result caused by executing a particular code snippet to correct a semantic error in particular code from the third-party library, wherein a first code snippet that has a higher success rate for correcting an error is ranked higher than a second code snippet that has a lower success rate than the first code snippet for correcting the error, and wherein said one or more code snippets displayed are ranked based on execution feedback provided by peer developers for correcting said at least one semantic error;
  executing, using a code executor, said code inputted in said integrated development environment and said code snippet;
  automatically transmitting results of execution of the code snippet to the collaboration datastore;
  determining whether or not said code snippet selected corrected said at least one semantic error for said node identified;
  if said code snippet selected is determined not to have corrected said at least one semantic error, transmitting a new execution feedback conveying failure of said code snippet selected to correct said at least one semantic error;
  receiving additional feedback from said peer developers for correcting said at least one semantic error when said code snippet does not correct said at least one semantic error identified;
  ranking said one or more code snippets displayed for correcting said at least one semantic error for said node identified using said additional feedback received from said peer developers;
  constructing, by a code parser, an Abstract Syntax Tree (AST) representation of the code inputted in the code editor;
  providing by a collaboration record locator, an interface to the collaboration datastore; and
  utilizing the AST constructed by the code parser to locate one or more collaboration records stored in the collaboration datastore.

18. The process according to claim 17, wherein said identifying step further comprises the steps of:
  inputting said code in said first instance of said code editor by said first developer in said integrated development environment; and
  constructing, using a code parser of said integrated development environment, a syntax tree representation of said code inputted by said first developer.

19. The process according to claim 18, wherein said determining step further comprises the steps of:
  determining whether or not said code snippet selected contains an error; and
  if said code snippet selected is determined to contain said error, transmitting error details to said collaboration datastore.

20. The process according to claim 19, wherein said selecting step further comprises the step of:
  providing a code snippet processor for ranking said one or more code snippets displayed for correcting said at least one semantic error for said node identified using any execution feedback received from a respective developer for said one or more code snippets executed for said one or more collaboration records located for said node identified, wherein a first code snippet that has a higher successful usage is ranked higher than a second code snippet with a lower successful usage, wherein the first code snippet that has a successful usage is ranked higher than the second code snippet that has some error occurrences within said second code snippet, and wherein the second code snippet that has some error occurrences within said second code snippet is ranked higher than a third code snippet that has failed to correct a semantic error.

21. The process according to claim 20, further comprising the steps of:

executing additional code inputted into a second instance of said code editor by a second developer in said integrated development environment; and identifying any nodes in said additional code to be executed that contains a semantic error pertaining to use of said third party library.

\* \* \* \* \*